(12) United States Patent
Jeon et al.

(10) Patent No.: US 11,032,231 B1
(45) Date of Patent: Jun. 8, 2021

(54) TECHNIQUES TO CONVERT MULTI-PARTY CONVERSATIONS TO AN EDITABLE DOCUMENT

(71) Applicant: Facebook, Inc., Menlo Park, CA (US)

(72) Inventors: Sung-eok Jeon, Bellevue, CA (US); Aliasgar Mumtaz Husain, San Jose, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 16/435,982

(22) Filed: Jun. 10, 2019

Related U.S. Application Data

(63) Continuation of application No. 15/161,232, filed on May 21, 2016, now Pat. No. 10,361,987.

(51) Int. Cl.
*G06F 15/177* (2006.01)
*H04L 12/58* (2006.01)

(52) U.S. Cl.
CPC ............. *H04L 51/32* (2013.01); *H04L 51/16* (2013.01)

(58) Field of Classification Search
CPC ................................ H04L 51/32; H04L 51/16
USPC ........................................................ 709/205
See application file for complete search history.

(56) References Cited

U.S. PATENT DOCUMENTS

| | | | | |
|---|---|---|---|---|
| 7,366,974 B2* | 4/2008 | Kalajian | ............... | G06F 40/123 715/248 |
| 7,886,012 B2* | 2/2011 | Bedi | .................... | G06Q 10/107 709/206 |
| 8,060,820 B2* | 11/2011 | Bedi | .................... | G06Q 10/107 715/256 |
| 8,171,087 B2* | 5/2012 | Carrer | .................... | H04L 51/04 709/206 |
| 8,620,869 B2* | 12/2013 | Consul | ................. | G06Q 10/107 707/662 |
| 8,639,552 B1* | 1/2014 | Chen | ................ | G06Q 10/06311 705/7.21 |
| 8,725,813 B2* | 5/2014 | Nalliah | .................... | H04L 51/38 709/206 |
| 8,983,828 B2* | 3/2015 | Convertino | ........... | G06F 16/353 704/9 |
| 9,380,011 B2* | 6/2016 | Rasmussen | ......... | G06F 3/04817 |
| 9,449,906 B2* | 9/2016 | Kirby | ................ | H01L 21/76898 |
| 9,614,804 B2* | 4/2017 | Myles | ..................... | H04L 51/22 |
| 2006/0206462 A1* | 9/2006 | Barber | ................ | G06F 16/3331 |

(Continued)

*Primary Examiner* — Atta Khan
(74) *Attorney, Agent, or Firm* — Kacvinsky Daisak Bluni PLLC

(57) ABSTRACT

Techniques to convert multi-party conversations to an editable document are described. In one embodiment, an apparatus may comprise a message queue monitoring component operative to monitor a messaging conversation between two or more messaging participants; and analyze the messaging conversation based on a plurality of domain-specific extractors; a domain selector component operative to determine that a domain detection level for a selected extractor exceeds a threshold; and a document component operative to generate an editable document based on the messaging conversation using the selected extractor and assign access permissions to the editable document automatically to the two or more messaging participants. Other embodiments are described and claimed.

17 Claims, 14 Drawing Sheets

(56) References Cited

U.S. PATENT DOCUMENTS

| | | | |
|---|---|---|---|
| 2007/0282660 A1* | 12/2007 | Forth | G06Q 10/10 |
| | | | 705/7.15 |
| 2009/0003552 A1* | 1/2009 | Goldman | G06Q 10/107 |
| | | | 379/88.22 |
| 2009/0006936 A1* | 1/2009 | Parker | G06F 40/166 |
| | | | 715/200 |
| 2009/0157709 A1* | 6/2009 | Kruger | G06F 16/90335 |
| 2009/0327294 A1* | 12/2009 | Bailor | G06F 21/6227 |
| 2010/0235367 A1* | 9/2010 | Chitiveli | G06F 16/353 |
| | | | 707/752 |
| 2011/0016387 A1* | 1/2011 | Mundy | G06F 21/6209 |
| | | | 715/255 |
| 2012/0151377 A1* | 6/2012 | Schultz | G06Q 10/103 |
| | | | 715/751 |
| 2013/0006973 A1* | 1/2013 | Caldwell | G06F 16/345 |
| | | | 707/723 |
| 2013/0013716 A1 | 1/2013 | Buchheit et al. | |
| 2013/0179799 A1* | 7/2013 | Savage | G06Q 10/103 |
| | | | 715/751 |
| 2014/0156785 A1 | 6/2014 | Kammula et al. | |
| 2015/0033155 A1* | 1/2015 | Camacho | H04L 51/32 |
| | | | 715/758 |
| 2015/0095979 A1* | 4/2015 | Windust | H04L 63/04 |
| | | | 726/3 |
| 2015/0331881 A1* | 11/2015 | Myles | H04L 51/22 |
| | | | 707/689 |
| 2017/0012985 A1* | 1/2017 | Meyers | G06F 21/31 |
| 2017/0084066 A1* | 3/2017 | Furuya | G06K 9/00221 |
| 2017/0262619 A1* | 9/2017 | Taneja | G06F 21/10 |

\* cited by examiner

TECHNIQUES TO CONVERT MULTI-PARTY CONVERSATIONS TO AN EDITABLE DOCUMENT

RELATED APPLICATIONS

This application is a continuation of, claims the benefit of and priority to previously filed U.S. patent application Ser. No. 15/161,232 filed May 21, 2016, titled "TECHNIQUES TO CONVERT MULTI-PARTY CONVERSATIONS TO AN EDITABLE DOCUMENT", which is hereby incorporated by reference in its entirety.

This application is also related to the United States patent application titled "TECHNIQUES TO CONVERT MULTI-PARTY CONVERSATIONS TO AN EDITABLE DOCUMENT," 16/436,039, filed Jun. 10, 2019, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to convert multi-party conversations to an editable document. Some embodiments are particularly directed to techniques to convert multi-party conversations to an editable document using a collection of domain-specific extractors monitoring an ongoing messaging conversation. In one embodiment, for example, an apparatus may comprise a message queue monitoring component operative to monitor a messaging conversation between two or more messaging participants; and analyze the messaging conversation based on a plurality of domain-specific extractors; a domain selector component operative to determine that a domain detection level for a selected extractor exceeds a threshold; and a document component operative to generate an editable document based on the messaging conversation using the selected extractor and assign access permissions to the editable document automatically to the two or more messaging participants. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
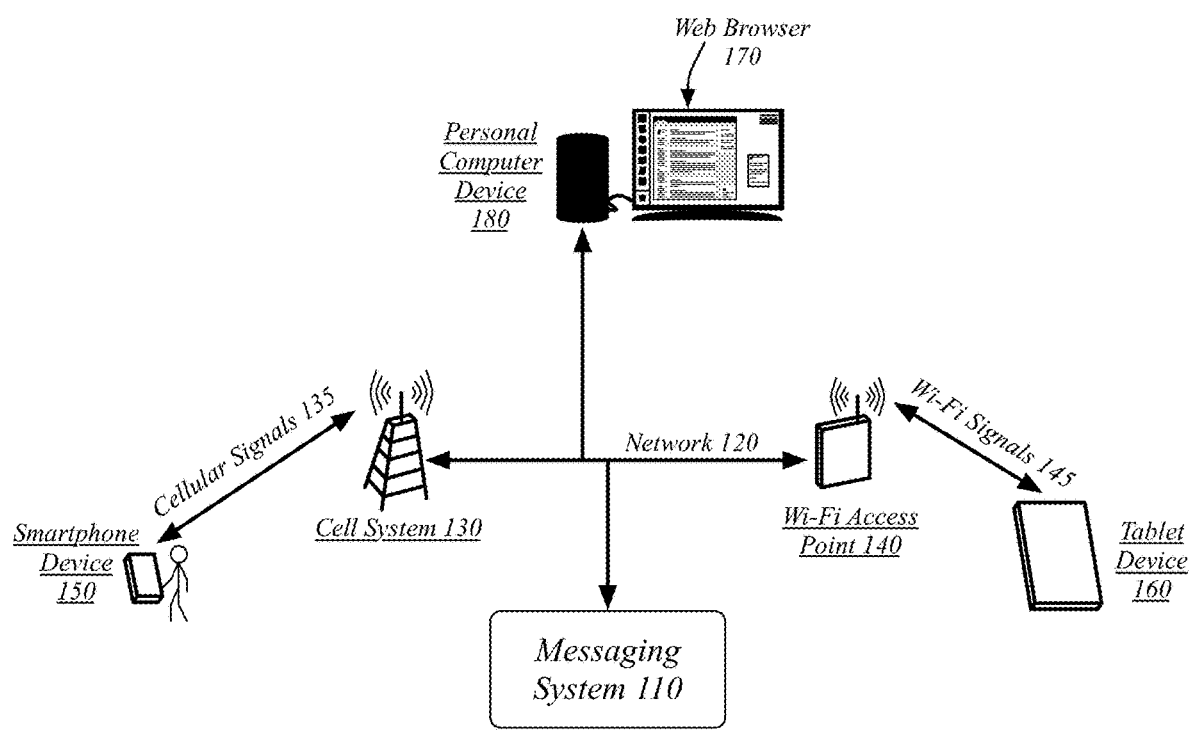
FIG. 1 illustrates an embodiment of a message to document conversion system.

Users of a messaging system may exchange messages with each other in the discussion of various topics. In some cases, it may be beneficial to these users to encapsulate a collection of messages related to a particular topic in a note that can then be used to refer to the conversation surrounding that topic.

In some cases, creating a note that collects together the contents of a conversation may help move a discussion from the primarily interactive space of a message thread to the collaborative and constructive space of creating a document. For instance, a group of programmers may interact in a group thread discussing a problem that has developed with a server system they developed. This conversation may include a specification of the problem and a discussion of the possible solutions. There may reach a point, however, where an informal discussion of a problem benefits from being transitioned to a more formal statement of the problem and outline of the possible solutions that can be distributed to additional parties and that can be more easily referenced once a particular solution is decided on. The programmers may therefore benefit from a system that extracts the relevant content from the conversation and constructs a document based on that content. This may make it easier to reference the contents of the discussion than scrolling backwards through a message history. This may also empower the distribution of the contents of the discussion to other parties, such as for escalating an array of possible solution to a supervisor for approval. Such a document is not necessarily static, and may be edited as the process of responding to the problem continues.

In another example, creating a note that collects together the contents of a conversation may provide a more useful archival of a conversation. For example, friends with a shared interest in a particular activity, such as watching soccer, may use a message thread to discuss a series of games, the progression of a league, etc. A user wishing to retrieve a previous comment may benefit from having, for example, the conversation relating to each of a series of games each encapsulated in a particular note. Rather than finding the place in a sequence of messages that a comment was made, they might simply find the place in a sequence of notes that relates to the game they're interested in, and then find the relevant comment within the note for that game.

In some cases, a conversation may have a natural period of relevance that eventually comes to an end. For example, a group of friends may discuss where to go on a vacation. The conversation regarding the conversation may be relevant while the vacation is being planned, but once the vacation has actually occurred the conversation may no longer be relevant. As such, in some embodiments, users may benefit from having a system automatically delete or archive notes that are no longer relevant.

As a result, the embodiments can improve the utility of a messaging system and note system for its users. Further, the embodiments can increase the use of a note system by guiding messaging users to the note system based on their use of the messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a message to document conversion system 100. In one embodiment, the message to document conversion system 100 may comprise a computer-implemented system having software applications comprising one or more components. Although the message to document conversion system 100 shown in FIG. 1 has a limited number of elements in a certain topology, it may be appreciated that the message to document conversion system 100 may include more or less elements in alternate topologies as desired for a given implementation.

The messaging system 110 may comprise one or more messaging servers operated by a messaging platform as part of the message to document conversion system 100. A messaging server may comprise an Internet-accessible server, with the network 120 connecting the various devices of the message to document conversion system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging system 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging system 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging system 110.

A messaging client may be a dedicated messaging client. A dedicated messaging client may be specifically associated with a messaging provider administering the messaging platform including the messaging system 110. A dedicated messaging client may be a general client operative to work with a plurality of different messaging providers including the messaging provider administering the messaging platform including the messaging system 110.

The messaging client may be a component of an application providing additional functionality. For example, a social networking service may provide a social networking application for use on a mobile device for accessing and using the social networking service. The social networking service may include messaging functionality such as may be provided by messaging system 110. It will be appreciated that messaging servers for the messaging system 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging system 110 due to it not maintaining or otherwise not having access to an existing state for the message inbox. The web browser 170 may then retrieve incremental updates for any new changes to the state of the message inbox so long as it maintains a user session with the messaging system 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 110 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 110 may use knowledge generated from interactions in between users. The messaging system 110 may comprise a component of a social-networking system and may use knowledge generated from the broader interactions of the social-networking system. As such, to protect the privacy of the users of the messaging system 110 and the larger social-networking system, messaging system 110 may include an authorization server (or other suitable component(s)) that allows users to opt in to or opt out of having their actions logged by the messaging system 110 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 110 and other elements of a social-networking system through blocking, data hashing, anonymization, or other suitable techniques as appropriate.

Figure 2:
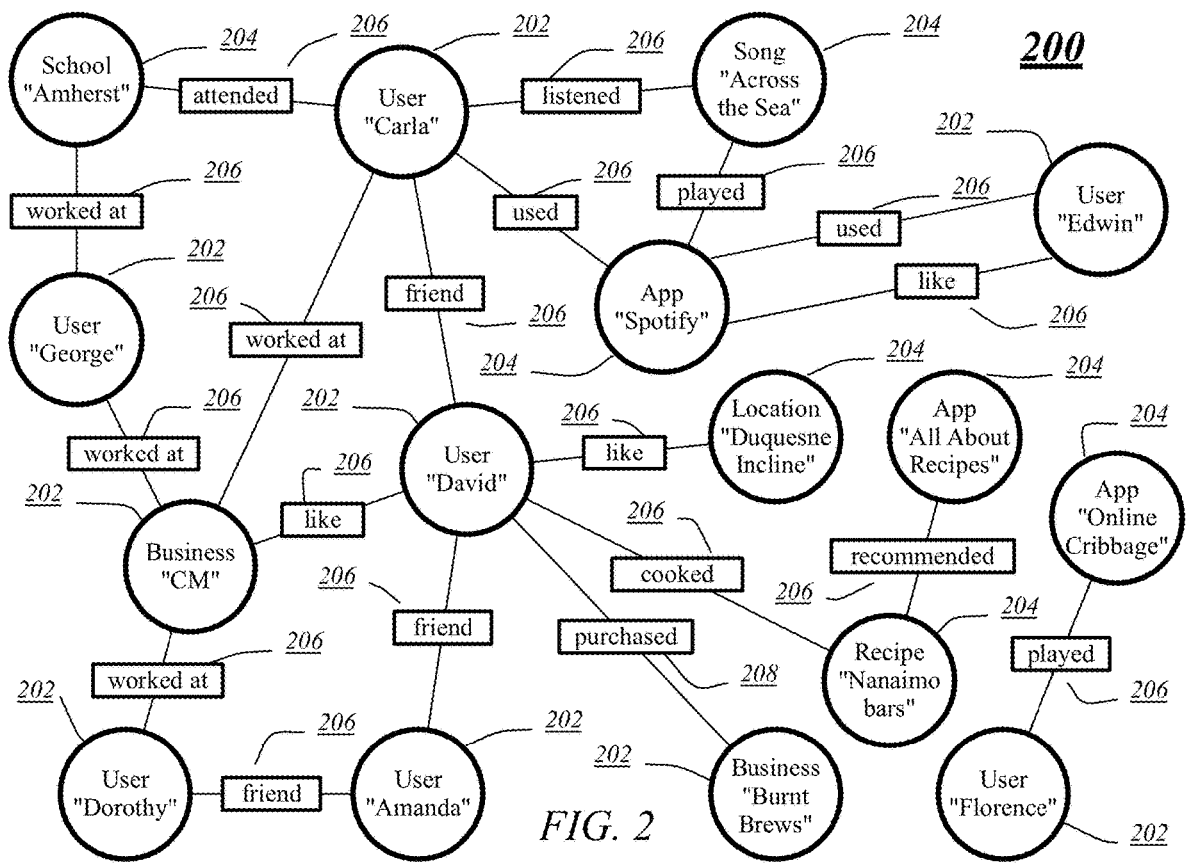
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
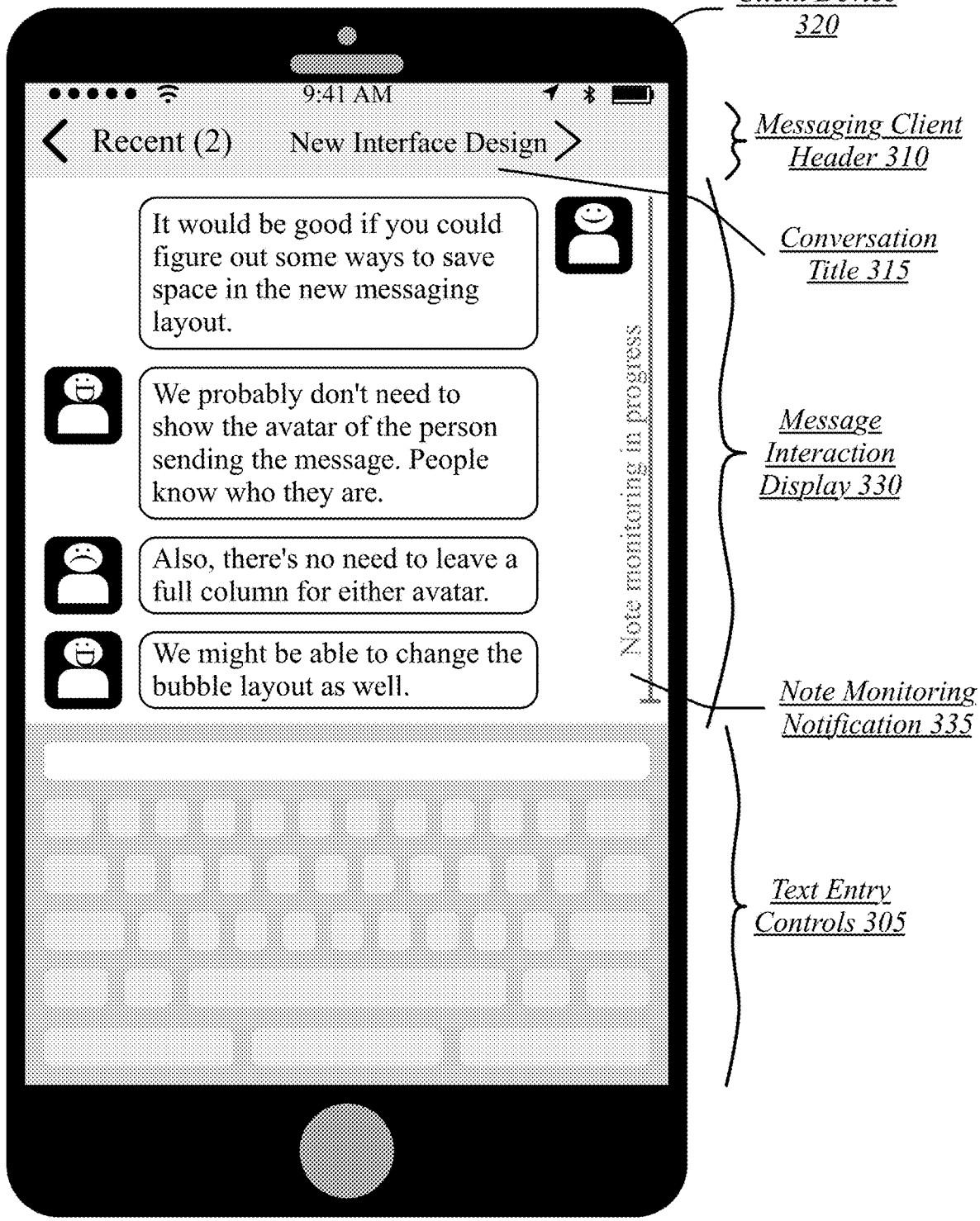
FIG. 3A illustrates an embodiment of a user interface for a messaging conversation.

FIG. 3A illustrates an embodiment of a user interface 300 for a messaging conversation.

A user interface 300 may be displayed on a client device 320. The client device 320 may correspond to, without limitation, a smartphone device 150, a personal computer device 180, a tablet device 160, or any other form of client device. The user interface 300 may be displayed via a web browser, such as may execute on a smartphone device 150, tablet device 160, personal computer device 180, or other device. The user interface 300 may be displayed in a messaging application, such as may execute on a smartphone device 150, tablet device 160, personal computer device 180, or other device. The user interface 200 may be displayed using a variety of techniques, without limitation to the examples listed here.

The user interface 30 may comprise a user interface for a group message thread. At least a portion of the message exchange for the message thread may be displayed in a message thread interaction display 330. A message thread interaction display 330 may comprise a display of one or more messages exchanged by the users of the message thread. The features discussed with regards to a group message thread may also be applied to one-on-one message threads.

Each of the one or more messages may be represented by a particular message bubble. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both of the message bubbles and the background may be customized and configured by users of the message to document conversion system 100.

A client device 320 may include controls for operating the user interface 300 and other user interfaces. The controls may include text entry controls 305 empowering the entering of text for the composition of text-based messages. The controls may include hardware controls. In some embodiments, controls may be touchscreen-based controls. In some embodiments, the controls may empower the messaging of non-text content, such as photos, videos, audio files, images, animated images, or other media content.

A messaging client may display a messaging client header 310. The messaging client header 310 may comprise a conversation title 315 for a message thread. The conversation title 315 may be assigned by the users involved in the message thread. The conversation title 315 may relate to the content of the message thread and, as such, may be repurposed for use a title for an extracted note. The messaging client header 227 may comprise a control to return a user to an inbox view for the messaging client. An inbox view control may be augmented with a number of recent message threads with unread messages.

A messaging client may display a note monitoring notification 335. The note monitoring notification 335 may be displayed when the message to document conversion system 100 is monitoring a messaging conversation for the presence of content for a note based on the content of the messaging conversation. In some embodiments, the document conversion system 100 may continuously monitor some or all messaging conversations. In these embodiments, the note monitoring notification 335 may be displayed when an extractor has reached at least a threshold level of confidence that content for a note relevant to its domain is present in the messaging conversation. This threshold level of confidence may be lower than the confidence used for the actual creation of a note or may be the same threshold. The note monitoring notification 335 may include a visual notification of the portion of the messaging conversation being considered for inclusion in the note, as may be specified by an extractor.

Figure 3B:
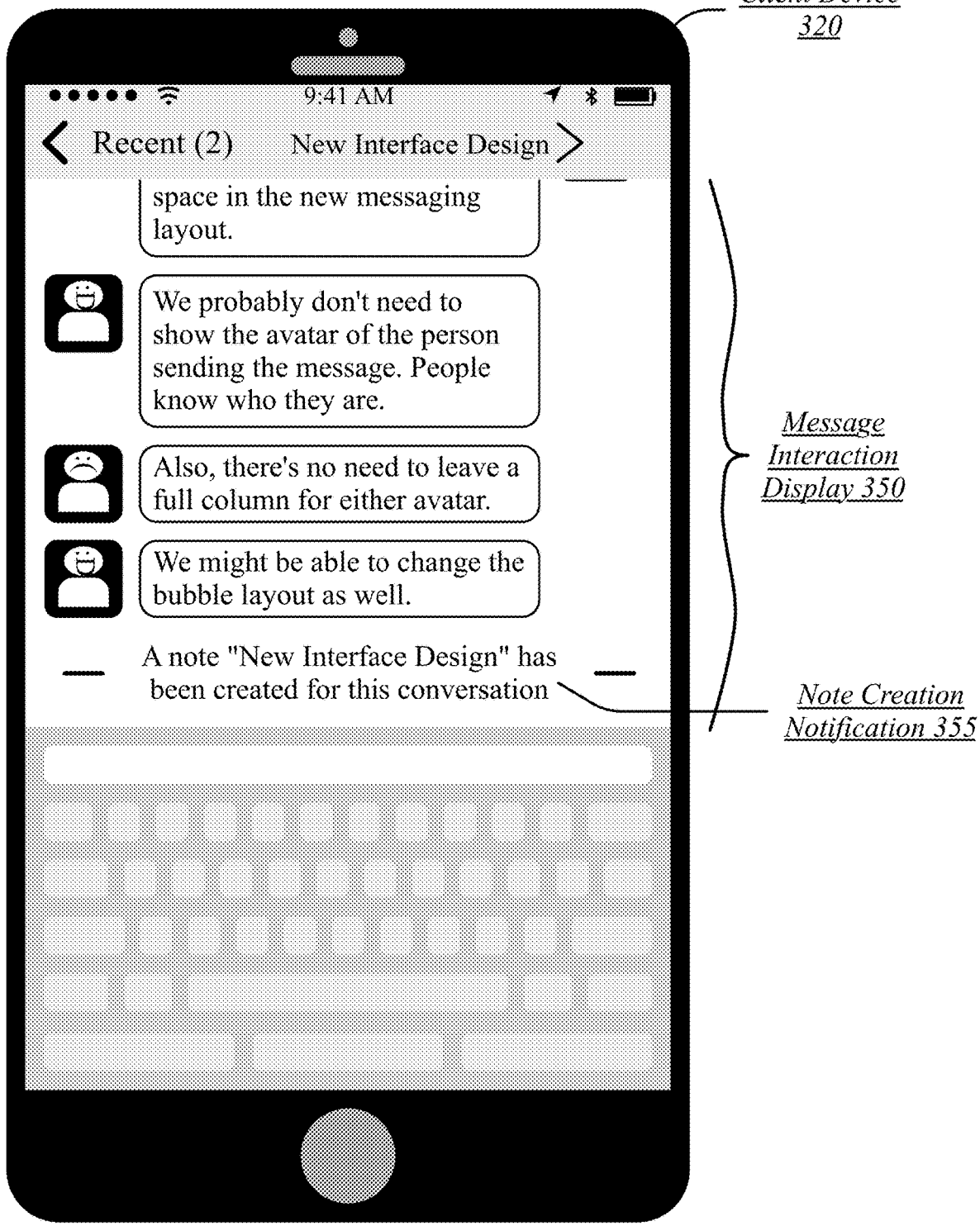
FIG. 3B illustrates an embodiment of a user interface for a messaging conversation including a note creation notification.

FIG. 3B illustrates an embodiment of a user interface 340 for a messaging conversation including a note creation notification 355.

FIG. 3B may correspond to FIG. 3A after the creation of a note corresponding to the messaging conversation. The user interface 340 may therefore be updated to an updated message interaction display 350. The user interface 340 may therefore be updated to remove the note monitoring notification 335. The user interface 340 may therefore be updated to include a note creation notification 355. The note creation notification 355 may indicate to a user that a note has been created corresponding to at least a portion of a message thread. The note creation notification 355 may be selectable and, when selected, transition a user to a view of the created note. The note creation notification 355 may, in some embodiments, include a title for the created note, as may be based on a title assigned to the message thread.

Figure 3C:
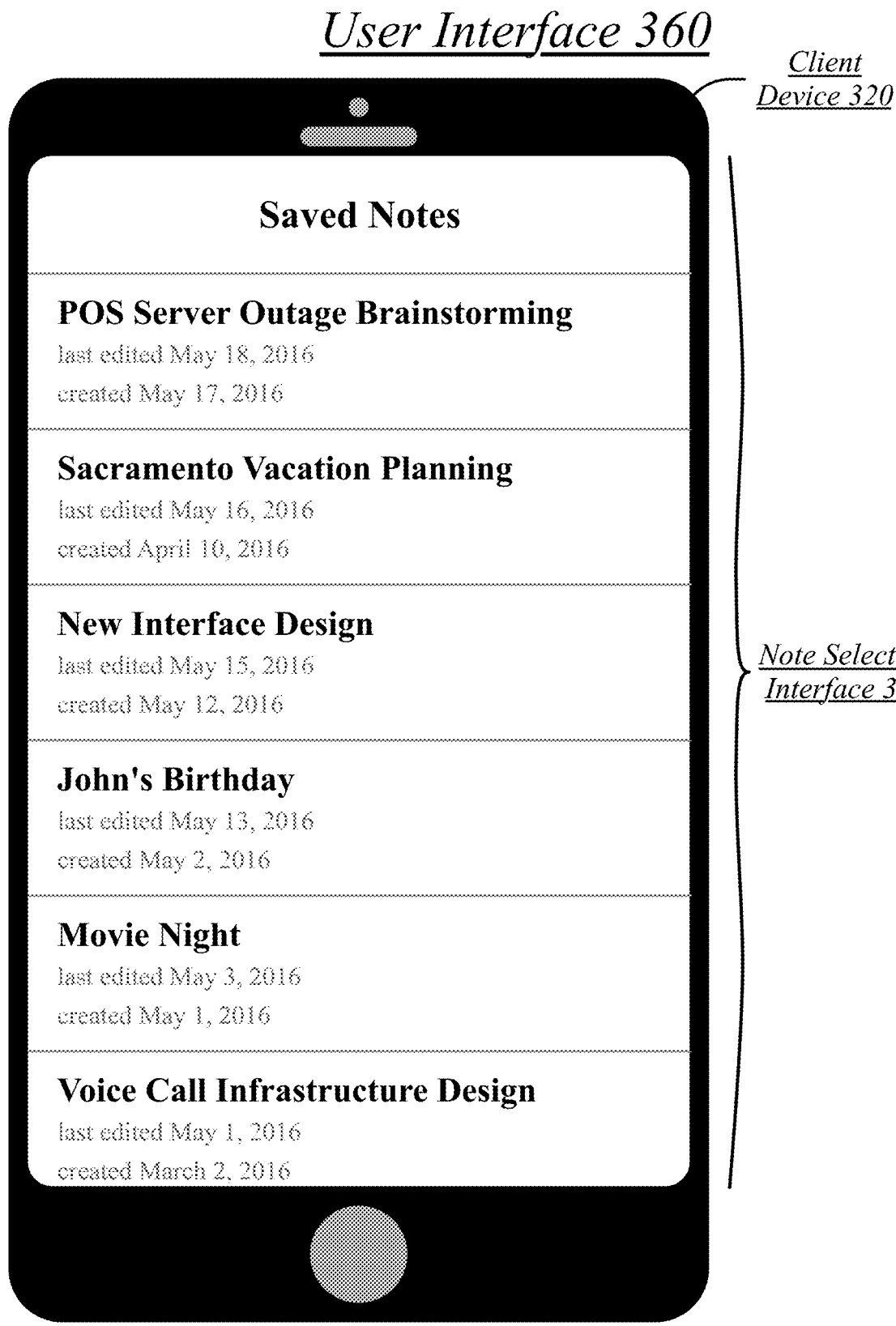
FIG. 3C illustrates an embodiment of a user interface for a note selection interface.

FIG. 3C illustrates an embodiment of a user interface 360 for a note selection interface 370.

The note selection interface 370 may comprise a plurality of indexed notes, wherein each indexed note communicates one or more pieces of information relevant to a note. For instance, a title, a last-edited date, a created date, one or more authors, one or more editors, or any other relevant information. The selection of a note may open the note for viewing and/or editing. In some cases, the note selection interface 370 may comprise an element of a messaging application. In other cases, the note selection interface 370 may comprise an element of a separate application.

Figure 4:
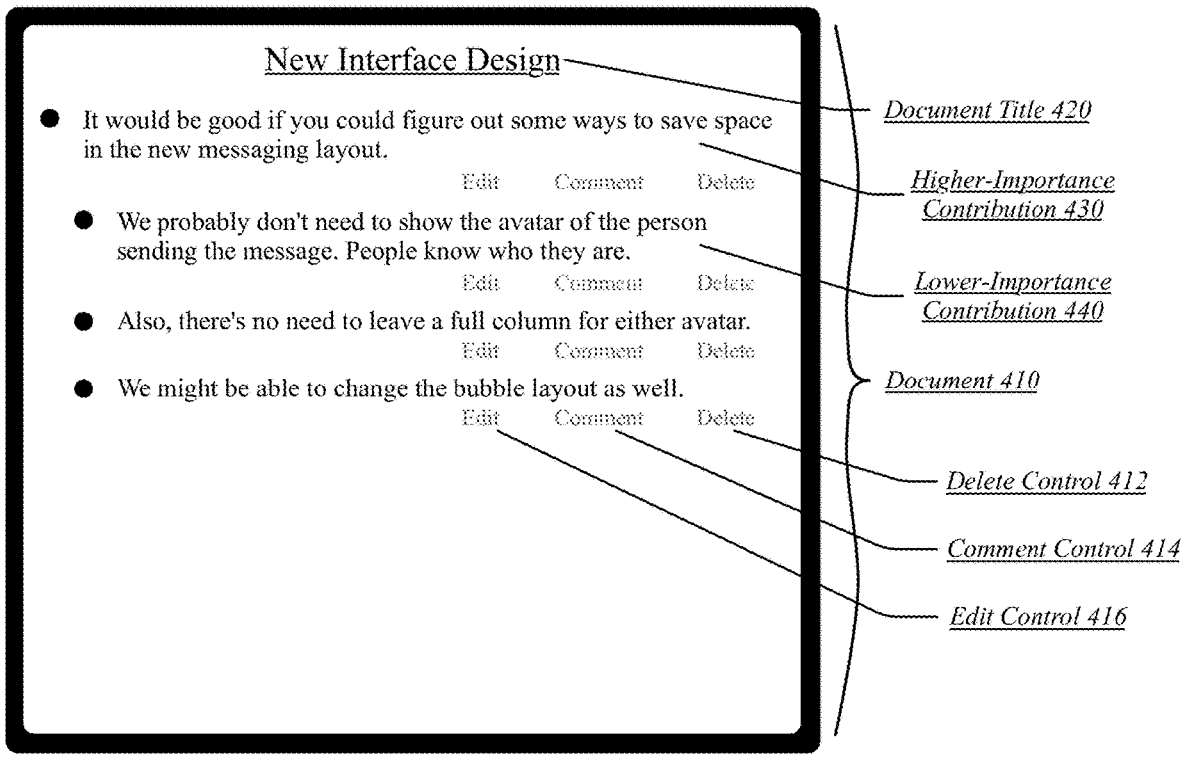
FIG. 4 illustrates an embodiment of a user interface for an editable document.

FIG. 4 illustrates an embodiment of a user interface 400 for an editable document 410.

The user interface 400 may correspond to a user interface for a document-editing application, a document-editing page for a web application, or any other document-editing embodiment. The user interface 400 may empower a user to view an encapsulation of a messaging conversation as a document and to edit the editable document 410.

The document 410 may comprise a document title 420. The document title 420 may comprise a name of the document 410. The document title 420 may be displayed prominently with the document 410, such as at the top of the document 410.

The document 410 may comprise a higher-importance contribution 430. A higher-importance contribution 430 may be associated with a contributor, such as a participant in the messaging conversation, to which a higher importance is assigned. Such higher importance may be defined based on the relationship between messaging participants. The relationship between participants may be determined based on a social graph. A higher-importance participant may comprise an organizer, supervisor, or other figure of importance related to a conversation. The message to document conversion system 100 may prevent at least a portion of users from editing the higher-importance contribution 430 based on editing permissions reflecting the higher importance of the contributor that composed the message upon which the higher-importance contribution 430 is based.

The document 410 may comprise a lower-importance contribution 440. A lower-importance contribution 440 may be associated with a contributor, such as a participant in the messaging conversation, to which a lower importance is assigned. Such lower importance may be defined based on the relationship between messaging participants. The relationship between participants may be determined based on a social graph. The message to document conversion system 100 may provide a greater portion of users from editing the lower-importance contribution 440 than the higher-importance contribution 430 based on editing permissions reflecting the lower importance of the contributor that composed the message upon which the lower-importance contribution 440 is based.

Portions of the document 410 may be operative to be deleted. Portions of the document, which may correspond to a particular message from a messaging conversation, may be associated with a delete control 412. A delete control 412 may empower a user to delete a portion of the document 410. The authority to delete a portion of the document may be exclusively assigned to only those contributors with an importance at least equal to that messaging participant that resulted in the inclusion of that portion of the document 410.

Portions of the document 410 may be operative to be commented upon. Portions of the document, which may correspond to a particular message from a messaging conversation, may be associated with a comment control 414. A comment control 414 may empower a user to add a comment to that portion of the document 410. The authority to comment upon a portion of the document may be allowed to even those contributors with an importance lower than that messaging participant that resulted in the inclusion of that portion of the document 410.

Portions of the document 410 may be operative to be edited. Portions of the document, which may correspond to a particular message from a messaging conversation, may be associated with an edit control 416. An edit control 416 may empower a user to modify a comment to that portion of the document 410. The authority to edit a portion of the document may be allowed to only those contributors with an importance at least equal to that messaging participant that resulted in the inclusion of that portion of the document 410.

It will be appreciated that, in regards to the assignment of editing permissions, that assigned editing permissions may be an initial assignment of permissions that may be modified.

Figure 5:
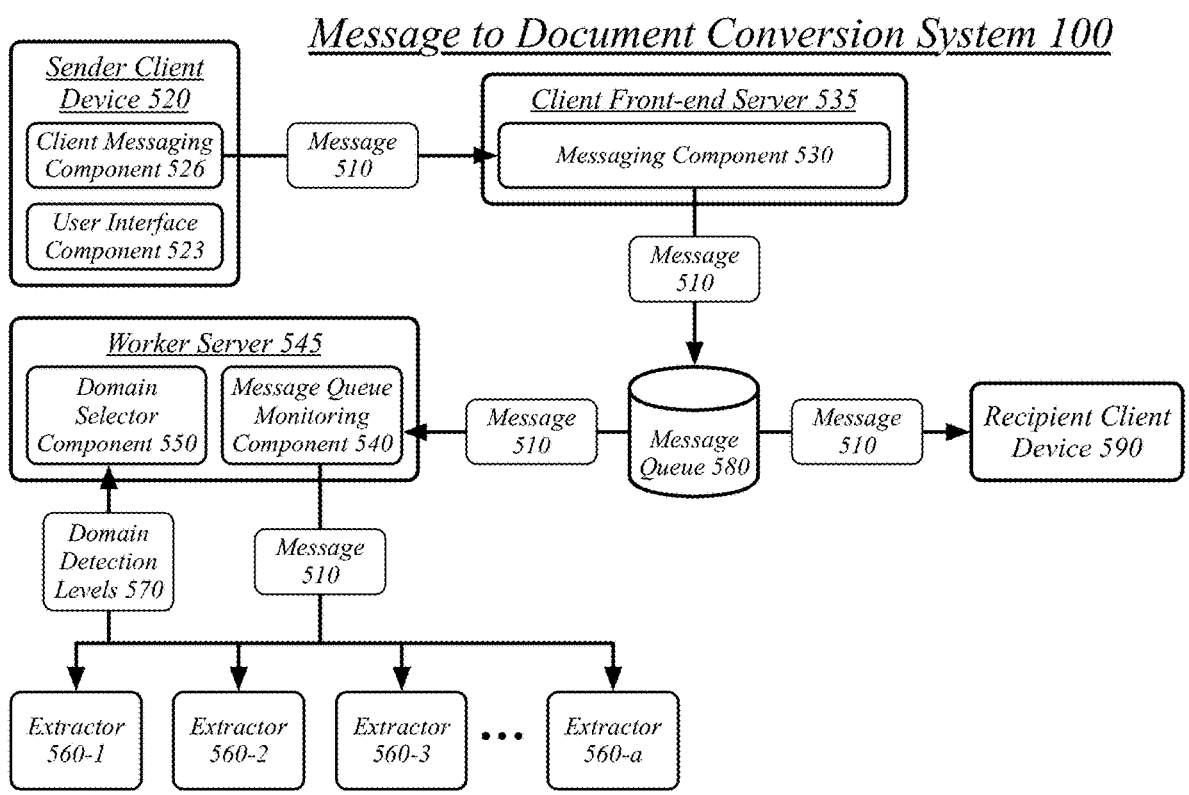
FIG. 5 illustrates an embodiment of a message to document conversion system monitoring a messaging conversation using extractors.

FIG. 5 illustrates an embodiment of a message to document conversion system 100 monitoring a messaging conversation using extractors 560.

A message to document conversion system 100 and messaging system 110 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers 110 through network communication. For example, the messaging client transmitting or receiving messages to or from a client front-end server 935 may be interpreted as using the network interface controller for network access to a communications network for the transmission or reception of information.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535. Each of a sender client device 520 and a recipient client device 590 may execute a messaging client.

A client front-end server 535 may be generally arranged to act as a network access point to the messaging system 110 for client devices such as sender client device 520. The client front-end server 535 may comprise a messaging component 530, the messaging component 530 generally arranged to act as a network access point to messaging services for the messaging system 110. The messaging component 530 may receive the message 510 from a sender client device 520 and add the message 510 to a message queue 580.

The message queue 580 may be specifically associated with the user of sender client device 520, such as by being uniquely associated within the messaging system 110 with a user account for the user of sender client device 520. The message queue 580 may be a single queue used for all messaging endpoints used by this user. The message queue 580 may comprise a representation of updates in a strict linear order. The message queue 580 may be organized as a data unit according to a variety of techniques. The message queue 580 may be stored in semi-persistent memory, persistent storage, both semi-persistent memory and persistent storage, or a combination of the two. The message queue 580 may be organized according to a variety of data structures, including linked lists, arrays, and other techniques for organizing queues. The message queue 580 may generally comprise a first-in-first-out (FIFO) queue in which no update will be removed from the queue before any updates that were received prior to it.

The messaging system 110 may comprise a worker server 545. In general, the messaging system 110 may comprise a plurality of worker servers that may be assigned to various tasks. A worker server 545 may comprise a message queue monitoring component 540, the message queue monitoring component 540 arranged to monitor updates, such as may comprise messages, in the message queue 580 and other message queues of the messaging system 110 for various flags, indicators, and other information. A worker server may comprise a domain selector component 550, the domain selector component arranged to interact with and manage a plurality of extractors 560.

The message to document conversion system 100 may comprise a plurality of extractors 560. The extractors 560 may comprise applications, routines, components, or other embodiments. The extractors 560 may operate according to natural language processing (NLP) techniques. Each of the extractors 560 may be operative to receive messages, to provide detection levels indicating the probability that that the messages they receive correspond to a relevant note for creation and create notes when requested by a domain selector component 550. The extractors 560 may be domain-specific extractors 560. A plurality of domain-specific extractors 560 may correspond to a plurality of domains, the plurality of domains comprising one or more of a social events domain, a design document domain, a user interface design domain, a design ideas domain, a strategy document domain, and a coordination plan domain.

The domain selector component 550 may be operative to monitor a messaging conversation between two or more messaging participants and analyze the messaging conversation based on a plurality of domain-specific extractors 560. The messaging conversation may comprise a sequence of messages sent between two or more client devices. A sender client device 520 may send a message 510 that is delivered, via a message queue 580, to at least one recipient client device 590. The message queue monitoring component 540 may retrieve the message 510 from the message queue 580 and submit it to the plurality of extractors 560.

Each of the extractors 560 may determine a domain detection level for the domain associated with that extractor. The domain detection levels 570 may represent a probability determined by each extractor as to whether a messaging conversation corresponds to a domain-relevant discussion that the participants in the messaging conversation may be interested in viewing as a note. The domain detection levels 570 may be reported to the domain selector component 550 by the extractors 560. The domain selector component 550 may determine that a domain detection level for a selected extractor exceeds a threshold and thereby determine to offer a note comprising the contents of the messaging conversation to the participants as an editable document.

In some embodiments, a message queue monitoring component 540 may monitor the messaging conversation between the two or more messaging participants at a messaging server device. However, in other embodiments, the messaging conversation may be monitored at one or more of the client devices. In some embodiments, a messaging client may monitor the messaging conversation and analyze the conversation using one or more extractors 560. In some embodiments, a separate application on the client device may monitor the messaging conversation and analyze the conversation using one or more extractors 560.

In some embodiments, the message to document conversion system 100 may notify users that their messaging conversation is being monitored. The message queue monitoring component 540 may instruct the messaging component 530 to have the messaging client display a document extraction monitoring notification on one or more client devices corresponding to one or more of the two or more messaging participants.

In some embodiments, the message queue monitoring component 540 may continuously monitor all messaging conversations and feed their contents to the extractors 560. However, in other embodiments, the message queue monitoring component 540 may only sometimes provide messages from messaging conversations to the extractors, with the document extraction monitoring notification provided to the client devices when the extractors are provided with messaging content. The message queue monitoring component 540 may initiate providing messages to the extractors 560 based on a detection that more important messages are being exchanged, such as may be indicated by message length, word length within messages, messaging speed or frequency, the exchange of files and/or media, the presence or activity of higher-importance participants in a conversation, or other indicators.

In some cases, the domain selector component 550 may augment the selection of an extractor using additional information about the participants. The domain selector component 550 may determine a domain-relevant relationship between the two or more messaging participants. The domain-relevant relationship may be determined based on social graph information about the participants. Where this domain-relevant relationship is associated with a selected extractor, the domain selector component 550 may determine that the domain detection level for the selected extractor exceeds the threshold using a lower-requirement threshold based on the existence of this domain-relevant relationship between the two or more messaging participants. For example, a domain—such as a design document domain—may be associated with a working relationship. A domain-relevant relationship may therefore be any social graph relationship indicating a working relationship. Similarly, a domain—such as a social event domain—may be associated with a social relationship. A domain-relevant relationship may therefore be any social graph relationship indicating a social relationship, such as a friendship or romantic relationship.

Similarly, the domain selector component 550 may augment the selection of an extractor using the history between the messaging participants, such as may include a history of using the extractors 560. The domain selector component 550 may determine a domain-relevant history between the two or more messaging participants. Where the domain-relevant history is associated with the selected extractor, the domain selector component 550 may determine that the domain detection level for the selected extractor exceeds the threshold using a lower-requirement threshold based on this determining of the domain-relevant history between the two or more messaging participants. For instance, a lower-requirement threshold may be used with an extractor that the messaging participants have previously used.

Figure 6:
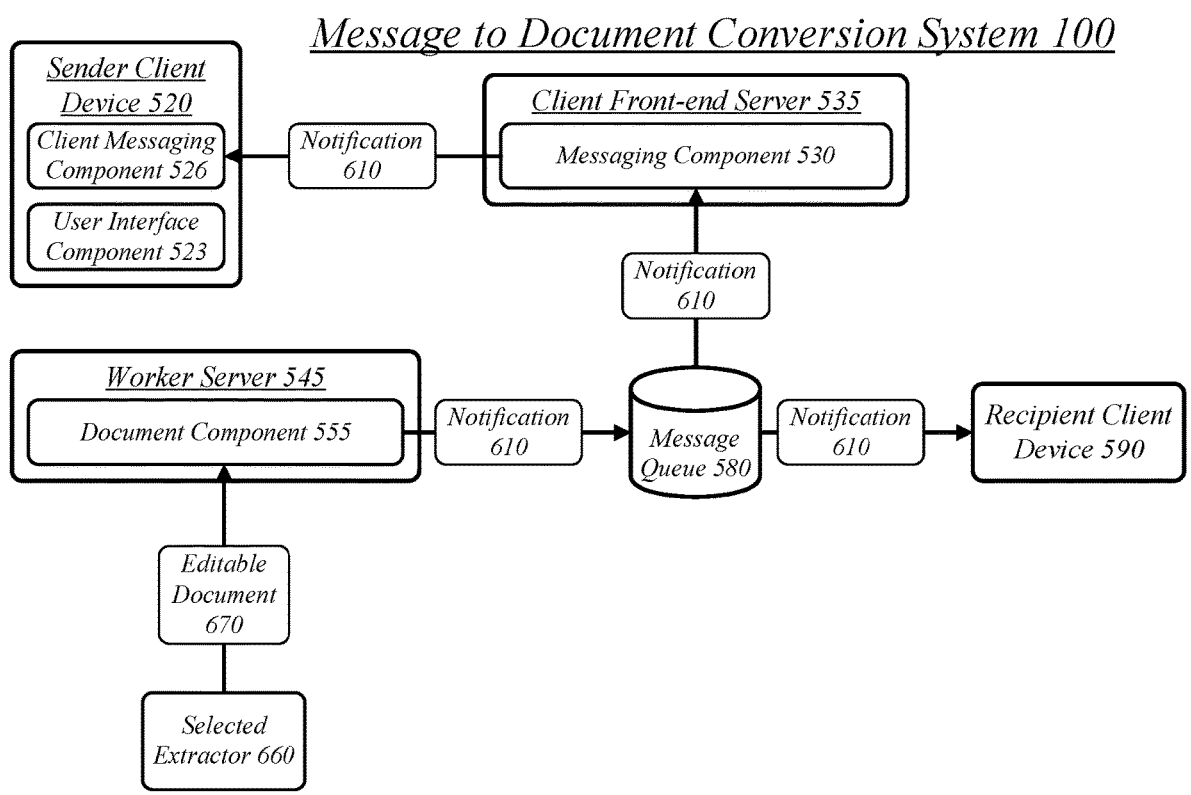
FIG. 6 illustrates an embodiment of a message to document conversion system using a selected extractor to generate an editable document.

FIG. 6 illustrates an embodiment of a message to document conversion system 100 using a selected extractor 660 to generate an editable document 670.

A worker server 545 may execute a document component 555. The document component 555 may be operative to use extractors 560 to generate documents. In some embodiments, the document component 555 may host the created documents for users. In other embodiments, other components may be used to host the created documents. These other components may be part of the messaging system 110, document conversion system 100, or another system altogether.

The document component 555 may be operative to generate an editable document 670 based on the messaging conversation using the selected extractor 660 in response to the domain selector component 550 determining that a domain detection level for a selected extractor exceeds a threshold. The document component 555 may generate the editable document 670 using the selected extractor 660 by instructing the selected extractor 660 to generate the editable document 670.

The document component 555 may assign access permissions to the editable document 670 automatically to the two or more messaging participants. Access permissions may authorize the messaging participants to access the editable document 670 for reading. Permission to at least read the editable document 670 may be automatically assigned to each of the messaging participants in the messaging conversation, with other users prevented from accessing the editable document 670. Additional users may be authorized to access the editable document 670 through modification to the access permissions by a user with permission to do so.

The document component 555 may determine an importance ranking for the two or more messaging participants and assign editing permissions to the editable document 670 based on the importance ranking. Editing permissions may control whether users have the authorization to comment on the editable document 670, add content to the editable document 670, change contents of the editable document 670, and/or delete content from the editable document 670. The importance ranking may be determined based on social graph information represented in a social graph. For instance, the two or more messaging participants may comprise at least a lower-ranked participant and a higher-ranked participant. The editable document 670 may comprise a document portion generated based on a higher-ranked participant message. In this instance, the lower-ranked participant of the two or more messaging participants may be blocked from editing the document portion generated based on the higher-ranked participant message.

The document component 555 may display an editable document notification 610 on one or more client devices corresponding to one or more of the two or more messaging participants in response to generating the editable document 670. The editable document notification 610 may be added to a message queue 580 for each of the participants. In cases in which the editable document 670 is deleted or archived after a determined period of time, the document component 550 may remove the editable document notification 610 in response to the elapsing of a relevance extinction time for the editable document 670.

The selected extractor 660 may use only a portion of the messaging conversation when generated the editable document 670. The messaging conversation comprises a plurality of messages and the selected extractor 660 may identify one or more incidental messages of the plurality of message and exclude the one or more incidental messages when generating the editable document 670 based on the messaging conversation. Incidental messages may include low-content personal interactions, such as greetings, goodbyes, etc. Incidental messages may include messages not relevant to the domain of the selected extractor 660. For instance, a selected extractor 660 for design documents may exclude messages interleaved with the design messages that discuss where the design team will go to get lunch, even if those messages would be deemed relevant to a social event extractor.

In some cases, a selected extractor 660 may determine a relevance extinction time for an editable document 670. The extractor 660 may determine that the editable document 670 relates to a topic that loses relevance after a set time. For instance, an editable document 670 for a social event may lose its relevance after the occurrence of the event. An editable document 670 for designing a fix to a software bug may lose its relevance after the bug is fixed. The document component 555 may therefore receive a relevance extinction time for the messaging conversation from the selected extractor 660. In some embodiments, the document component 555 may assign an auto-archival time to the editable document 670 based on the relevance extinction time, wherein at the extinction of the auto-archival time the editable document 670 is moved to an archive. In other embodiments, the document component 555 may assign an auto-deletion time to the editable document 670 based on the relevance extinction time, wherein at the extinction of the auto-deletion time the editable document 670 is deleted.

In some cases, a messaging conversation may have a title. For instance, a message thread may be assigned a title by the participants in the thread. The document component 555 may extract the title for the messaging conversation, with this title assigned by one or more of the two or more messaging participants. The document component 555 may then attach the title of the messaging conversation to the editable document 670. In some cases, the title may be attached to the editable document 670 as a title for the editable document 670. In other cases, the title may be attached to the editable document 670 as a summary for the editable document.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
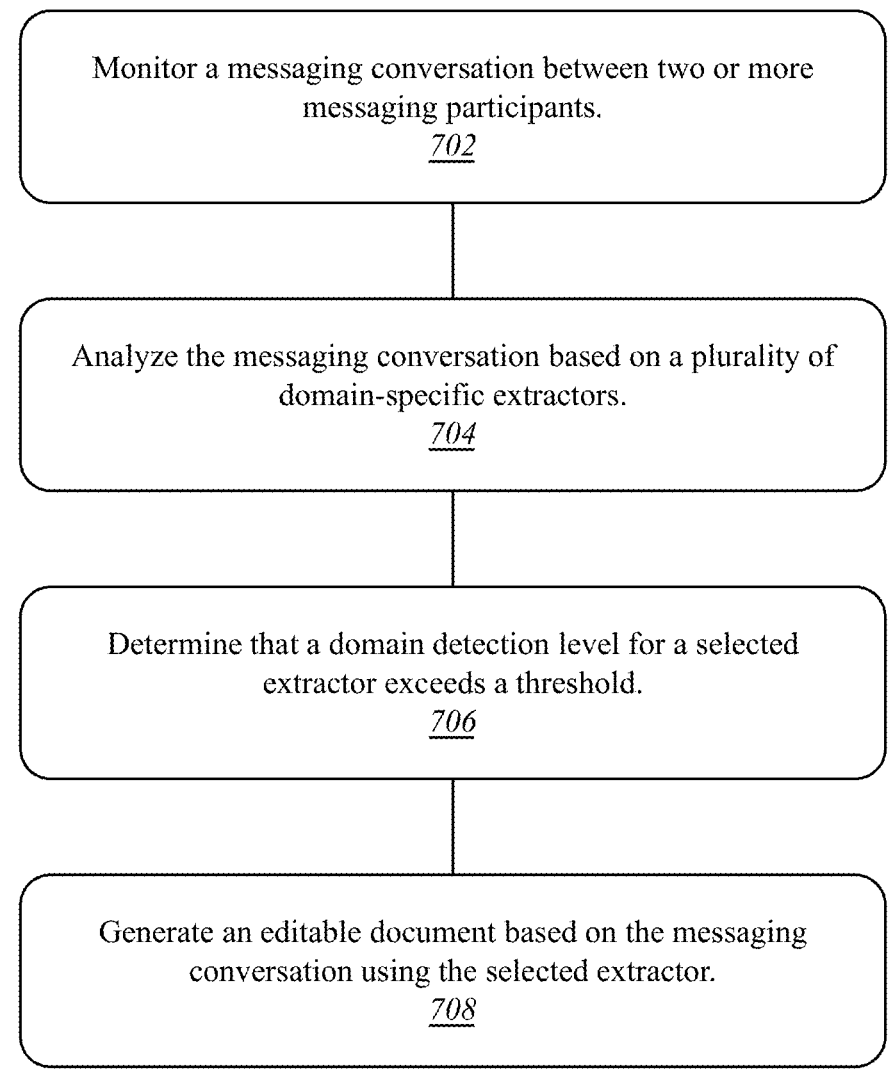
FIG. 7 illustrates an embodiment of a logic flow for the system of FIG. 1.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may monitor a messaging conversation between two or more messaging participants at block 702.

The logic flow 700 may analyze the messaging conversation based on a plurality of domain-specific extractors at block 704.

The logic flow 700 may determine that a domain detection level for a selected extractor exceeds a threshold at block 706.

The logic flow 700 may generate an editable document based on the messaging conversation using the selected extractor at block 708.

The embodiments are not limited to this example.

Figure 8:
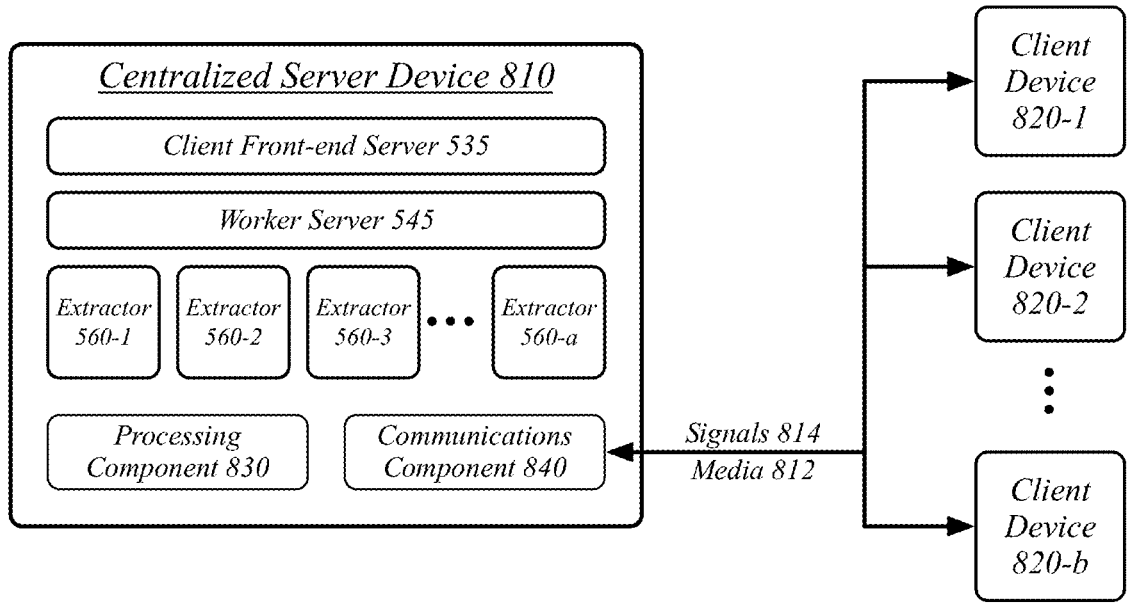
FIG. 8 illustrates an embodiment of a centralized system for the system of FIG. 1.

FIG. 8 illustrates a block diagram of a centralized system 800. The centralized system 800 may implement some or all of the structure and/or operations for the message to document conversion system 100 in a single computing entity, such as entirely within a single centralized server device 810.

The centralized server device 810 may comprise any electronic device capable of receiving, processing, and sending information for the message to document conversion system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 810 may execute processing operations or logic for the message to document conversion system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 810 may execute communications operations or logic for the message to document conversion system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 810 may communicate with client devices 820 over a communications media 812 using communications signals 814 via the communications component 840. The centralized server device 810 may implement the client front-end server 535 and the worker server 545. The centralized server device 810 may execute the client front-end server 535 and worker server 545. The centralized server device 810 may execute the plurality of extractors 560. The client devices 820 may correspond to any or all of the smartphone device 150, tablet device 160, personal computer device 180, client device 320, sender client device 520, recipient client device 590, or any other client device.

Figure 9:
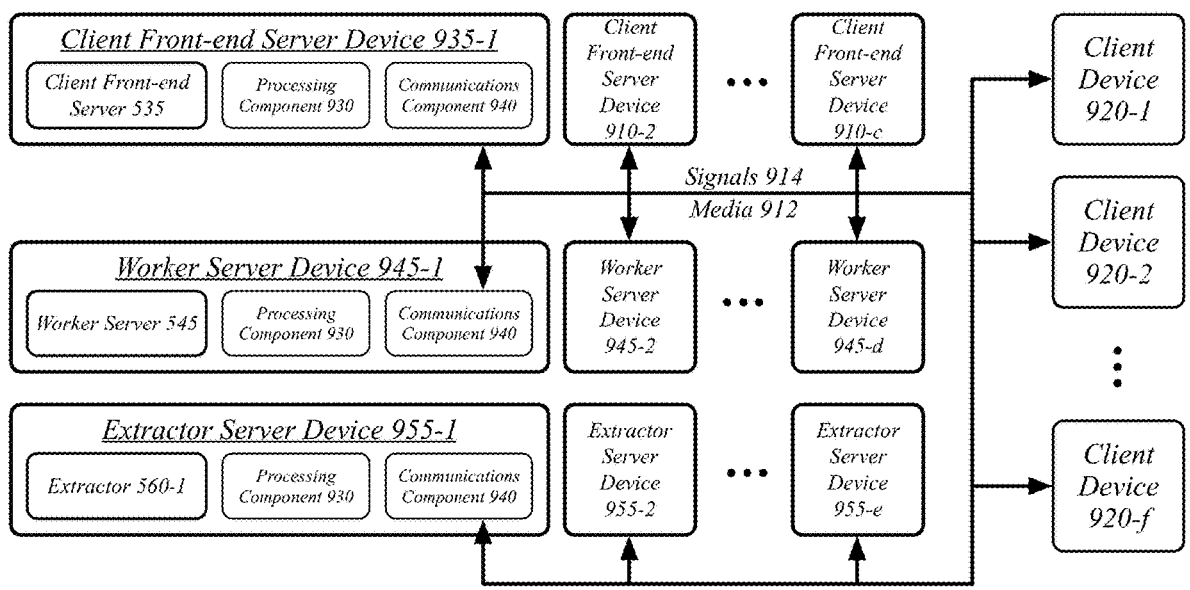
FIG. 9 illustrates an embodiment of a distributed system for the system of FIG. 1.

FIG. 9 illustrates a block diagram of a distributed system 900. The distributed system 900 may distribute portions of the structure and/or operations for the message to document conversion system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise client front-end server devices 935, worker server devices 945, and extractor server devices 955. In general, the server devices 935, 945, 955 may be the same or similar to the centralized server device 810 as described with reference to FIG. 8. For instance, the server devices 935, 945, 955 may each comprise a processing component 930 and a communications component 940 which are the same or similar to the processing component 830 and the communications component 840, respectively, as described with reference to FIG. 8. In another example, the server devices 935, 945, 955 may communicate over a communications media 912 using communications signals 914 via the communications components 940.

The client front-end server devices 935 may comprise or employ one or more server programs that operate to perform various methodologies in accordance with the described embodiments. In one embodiment, for example, the client front-end server devices 935 may each implement a client front-end server 535.

The worker server devices 945 may comprise or employ one or more server programs that operate to perform various methodologies in accordance with the described embodiments. In one embodiment, for example, the worker server devices 945 may each implement a worker server 545.

The extractor server devices 955 may comprise or employ one or more server programs that operate to perform various methodologies in accordance with the described embodiments. In one embodiment, for example, the extractor server devices 955 may each implement an extractor 560 of the plurality of extractors 560.

The client devices 920 may correspond to any or all of the smartphone device 150, tablet device 160, personal computer device 180, client device 320, sender client device 520, recipient client device 590, client devices 820, or any other client device.

Figure 10:
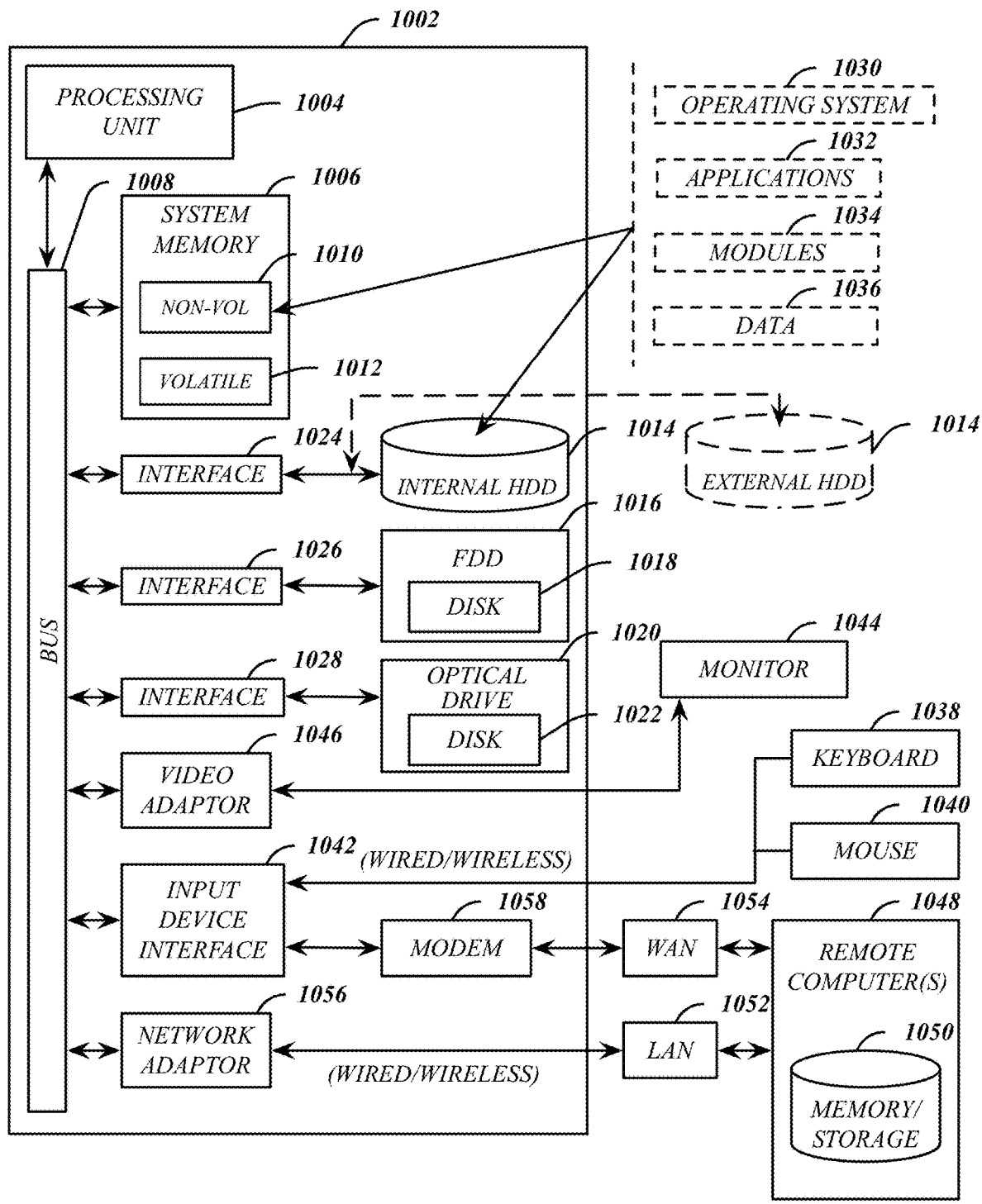
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the message to document conversion system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
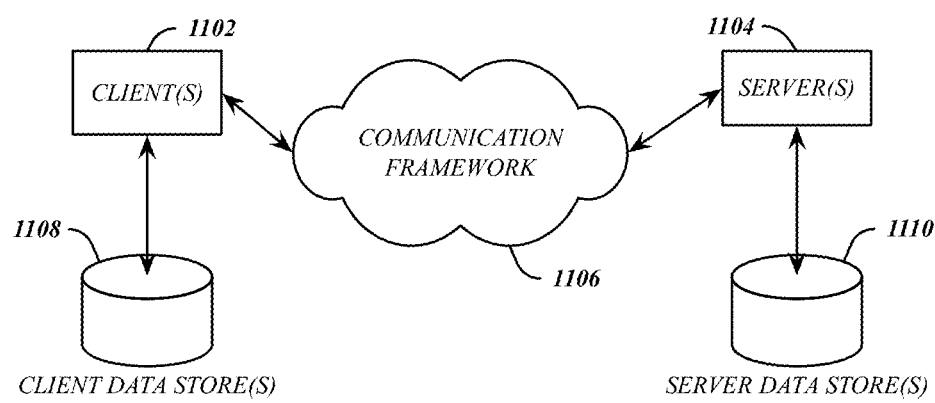
FIG. 11 illustrates an embodiment of a communications architecture.
Figure 12:
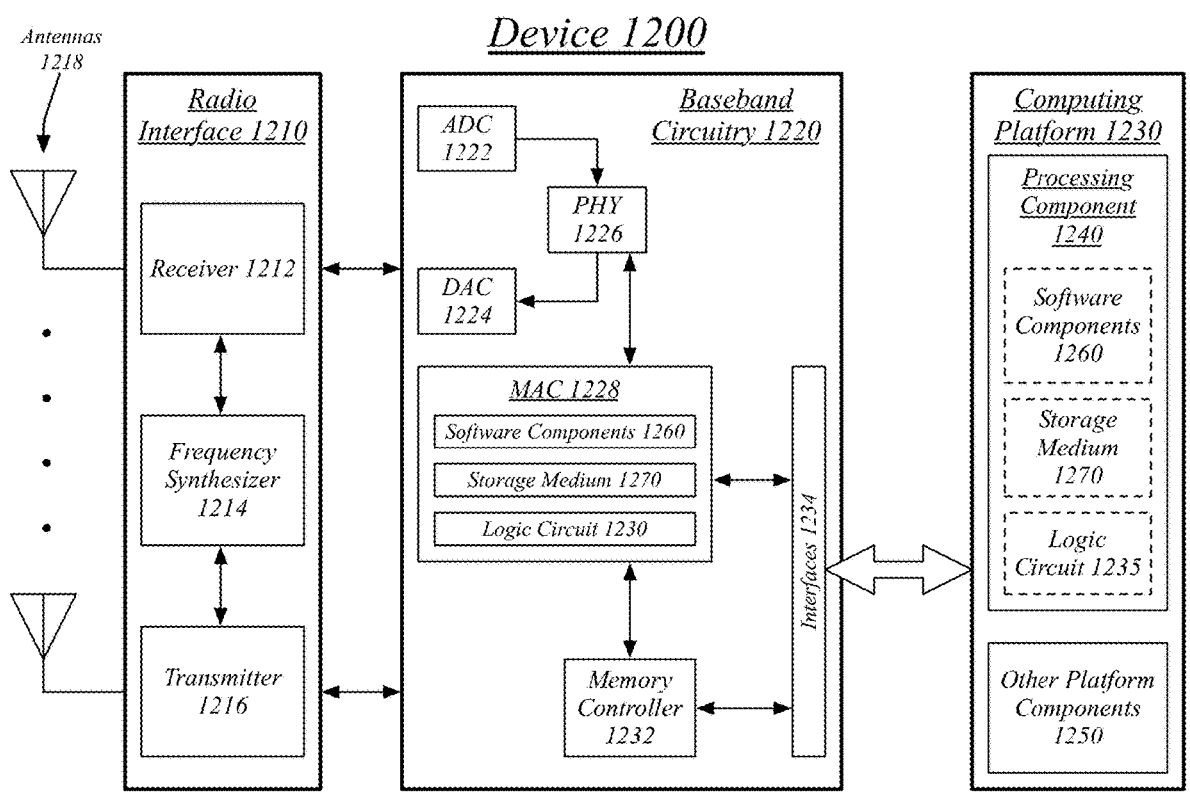
FIG. 12 illustrates an embodiment of a radio device architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the smartphone device 150, tablet device 160, personal computer device 180, client device 320, sender client device 520, recipient client device 590, client devices 820, client devices 920, or any other client device.

The servers 1104 may implement the centralized server device 810, client front-end server devices 935, worker server devices 945, extractor server devices 955, or any other server. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

FIG. 13 illustrates an embodiment of a device 1300 for use in a multicarrier OFDM system, such as the message to document conversion system 100. Device 1300 may implement, for example, software components 1360 as described with reference to message to document conversion system 100 and/or a logic circuit 1335. The logic circuit 1335 may include physical circuits to perform operations described for the message to document conversion system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the message to document conversion system 100 and/or logic circuit 1335 in a single computing entity, such as entirely within a single device. Alternatively, the device 1300 may distribute portions of the structure and/or operations for the message to document conversion system 100 and/or logic circuit 1335 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the message to document conversion system 100 and logic circuit 1335 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise monitoring a messaging conversation between two or more messaging participants; analyzing the messaging conversation based on a plurality of domain-specific extractors; determining that a domain detection level for a selected extractor exceeds a threshold; generating an editable document based on the messaging conversation using the selected extractor.

A computer-implemented method may further comprise determining a domain-relevant relationship between the two or more messaging participants, the domain-relevant relationship associated with the selected extractor; and determining that the domain detection level for the selected extractor exceeds the threshold using a lower-requirement threshold based on the determining of the domain-relevant relationship between the two or more messaging participants.

A computer-implemented method may further comprise determining a domain-relevant history between the two or more messaging participants, the domain-relevant history associated with the selected extractor; and determining that the domain detection level for the selected extractor exceeds the threshold using a lower-requirement threshold based on the determining of the domain-relevant history between the two or more messaging participants.

A computer-implemented method may further comprise displaying a document extraction monitoring notification on one or more client devices corresponding to one or more of the two or more messaging participants.

A computer-implemented method may further comprise displaying an editable document notification on one or more client devices corresponding to one or more of the two or more messaging participants in response to generating the editable document based on the messaging conversation using the selected extractor.

A computer-implemented method may further comprise removing the editable document notification in response to an elapsing of an relevance extinction time for the editable document.

A computer-implemented method may further comprise assigning access permissions to the editable document automatically to the two or more messaging participants.

A computer-implemented method may further comprise determining an importance ranking for the two or more messaging participants; and assigning editing permissions to the editable document based on the importance ranking.

A computer-implemented method may further comprise the two or more messaging participants comprising at least a lower-ranked participant and a higher-ranked participant, the editable document comprising a document portion generated based on a higher-ranked participant message, wherein the lower-ranked participant of the two or more messaging participants is blocked from editing the document portion generated based on the higher-ranked participant message.

A computer-implemented method may further comprise the messaging conversation comprising a plurality of messages, further comprising: identifying one or more incidental messages of the plurality of messages; and excluding the one or more incidental messages when generating the editable document based on the messaging conversation.

A computer-implemented method may further comprise receiving a relevance extinction time for the messaging conversation from the selected extractor; and assigning an auto-archival time to the editable document based on the relevance extinction time.

A computer-implemented method may further comprise receiving a relevance extinction time for the messaging conversation from the selected extractor; and assigning an auto-deletion time to the editable document based on the relevance extinction time.

A computer-implemented method may further comprise extracting a title for the messaging conversation, the title assigned by one or more of the two or more messaging participants; and attaching the title of the messaging conversation to the editable document.

A computer-implemented method may further comprise the title attached to the editable document as one or more of a title for the editable document and a summary for the editable document.

A computer-implemented method may further comprise monitoring the messaging conversation between the two or more messaging participants at a messaging server device.

A computer-implemented method may further comprise the plurality of domain-specific extractors corresponding to a plurality of domains, the plurality of domains comprising two or more of a social events domain, a design document domain, a user interface design domain, a design ideas domain, a strategy document domain, and a coordination plan domain.

An apparatus may comprise a processor circuit on a device; a message queue monitoring component operative on the processor circuit to monitor a messaging conversation between two or more messaging participants; and analyze the messaging conversation based on a plurality of domain-specific extractors; a domain selector component operative to determine that a domain detection level for a selected extractor exceeds a threshold; and a document component operative to generate an editable document based on the messaging conversation using the selected extractor. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
analyzing sent and received messages in a messaging conversation in a messaging application using a domain-specific extractor, the domain-specific extractor providing a probability that one or more messages in the messaging conversation pertain to a particular domain associated with the domain-specific extractor;
determining that some or all of the one or more messages have a probability that exceeds a threshold for the domain;
displaying, in the messaging conversation, a note monitoring notification associated with the messages having a probability exceeding the threshold, the note monitoring notification providing a visual notification of a portion of the being considered for inclusion in an editable note:
accessing social graph information regarding participants in the messaging conversation;
determining, based on the social graph information, that the one or more participants have a domain-relevant relationship; and
lowering the threshold for the domain based on the domain-relevant relationship.

2. The method of claim 1 further comprising:
extracting the one or more messages in the messaging conversation determined by the domain-specific extractor to pertain to the particular domain; and
creating the editable note containing the extracted messages.

3. The method of claim 2 further comprising:
displaying, in a user interface display of the messaging application, a note creation notification indicating that the editable note has been created.

4. The method of claim 3 further comprising:
receiving a user selection of the note creation notification; and
transitioning the user interface display to a view of the editable note.

5. The method of claim 3 wherein the note monitoring notification is removed from the user interface display when the note creation notification is displayed.

6. The method of claim 3 wherein the messaging conversation has a user-assigned title displayed in the user interface display, further comprising:
assigning a title to the editable note, the title comprising the user-assigned title of the messaging conversation.

7. An apparatus, comprising:
a processor on a device;
software, executable on the processor, operative to:
analyze sent and received messages in a messaging conversation in a messaging application using a domain-specific extractor, the domain-specific extractor providing a probability that one or more messages in the messaging conversation pertain to a particular domain associated with the domain-specific extractor;

determine that some or all of the one or more messages have a probability that exceeds a threshold for the domain;

display, in the messaging conversation, a note monitoring notification associated with the messages having a probability exceeding the threshold, the note monitoring notification providing a visual notification of a portion of the messaging conversation being considered for inclusion in an editable note;

access social graph information regarding participants in the messaging conversation;

determine, based on the social graph information, that the one or more participants have a domain-relevant relationship; and lower the threshold for the domain based on the domain-relevant relationship.

8. The apparatus of claim 7, the software further operative to:

extract the one or more messages in the messaging conversation determined by the domain-specific extractor to pertain to the particular domain; and create the editable note containing the extracted messages.

9. The apparatus of claim 8, the software further operative to:

display, in a user interface display of the messaging application, a note creation notification indicating that the editable note has been created.

10. The apparatus of claim 9, the software further operative to:

receive a user selection of the note creation notification; and transition the user interface display to a view of the editable note.

11. The apparatus of claim 9 wherein the note monitoring notification is removed from the user interface display when the note creation notification is displayed.

12. The apparatus of claim 9 wherein the messaging conversation has a user-assigned title displayed in the user interface display, the software further operative to:

assign a title to the editable note, the title comprising the user-assigned title of the messaging conversation.

13. A non-transitory, computer-readable storage medium comprising instructions that, when executed, cause a system to:

analyze sent and received messages in a messaging conversation in a messaging application using a domain-specific extractor, the domain-specific extractor providing a probability that one or more messages in the messaging conversation pertain to a particular domain associated with the domain-specific extractor;

determine that some or all of the one or more messages have a probability that exceeds a threshold for the domain;

display, in the messaging conversation, a note monitoring notification associated with the messages having a probability exceeding the threshold, the note monitoring notification providing a visual notification of a portion of the messaging conversation being considered for inclusion in an editable note;

access social graph information regarding participants in the messaging conversation;

determine, based on the social graph information, that the one or more participants have a domain-relevant relationship; and lower the threshold for the domain based on the domain-relevant relationship.

14. The medium of claim 13 comprising further instructions that cause the system to:

extract the one or more messages in the messaging conversation determined by the domain-specific extractor to pertain to the particular domain; and create the editable note containing the extracted messages.

15. The medium of claim 14 comprising further instructions that cause the system to:

display, in a user interface display of the messaging application, a note creation notification indicating that the editable note has been created; and remove the note monitoring notification from the user interface display.

16. The medium of claim 15, comprising further instructions that cause the system to:

receive a user selection of the note creation notification; and transition the user interface display to a view of the editable note.

17. The medium of claim 15 wherein the messaging conversation has a user-assigned title displayed in the user interface display, comprising further instructions that cause the system to:

assign a title to the editable note, the title comprising the user-assigned title of the messaging conversation.

* * * * *